United States Patent
Schultz (12)

(10) Patent No.: US 8,903,088 B2
(45) Date of Patent: Dec. 2, 2014

(54) BINDING OF PROTECTED VIDEO CONTENT TO VIDEO PLAYER WITH ENCRYPTION KEY

(75) Inventor: Roderick Schultz, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/310,032

(22) Filed: Dec. 2, 2011

(65) Prior Publication Data

US 2013/0142331 A1    Jun. 6, 2013

(51) Int. Cl.
H04N 7/167    (2011.01)

(52) U.S. Cl.
USPC .......................................................... 380/211

(58) Field of Classification Search
USPC .......... 380/228, 229, 214, 232, 249; 713/152, 713/161, 168, 170; 726/4, 21, 29, 340; 340/5.8; 705/67; 455/411; 379/142.04
See application file for complete search history.

(56) References Cited

U.S. PATENT DOCUMENTS

| | | | |
|---|---|---|---|
| 5,671,283 A | 9/1997 | Michener et al. | |
| 6,122,375 A | 9/2000 | Takaragi et al. | |
| 6,266,412 B1 | 7/2001 | Berenzweig et al. | |
| 6,333,983 B1 | 12/2001 | Enichen | |
| 6,370,247 B1 | 4/2002 | Takaragi et al. | |
| 6,480,957 B1 * | 11/2002 | Liao et al. | 713/170 |
| 6,778,667 B1 | 8/2004 | Bakhle et al. | |
| 6,792,113 B1 * | 9/2004 | Ansell et al. | 380/284 |
| 6,804,355 B1 | 10/2004 | Graunke | |
| 7,003,107 B2 | 2/2006 | Ananth | |
| 7,103,181 B2 | 9/2006 | Ananth | |
| 7,142,669 B2 | 11/2006 | Dworkin et al. | |
| 7,200,226 B2 | 4/2007 | Bace | |
| 7,213,156 B2 * | 5/2007 | Fukuda | 713/189 |
| 7,218,733 B2 | 5/2007 | Li et al. | |
| 7,221,756 B2 | 5/2007 | Patel et al. | |
| 7,269,664 B2 * | 9/2007 | Hutsch et al. | 709/246 |
| 7,269,854 B2 * | 9/2007 | Simmons et al. | 726/29 |
| 7,350,070 B2 * | 3/2008 | Smathers et al. | 713/150 |
| 7,412,060 B2 * | 8/2008 | Fukuda | 380/277 |
| 7,418,100 B2 | 8/2008 | McGrew et al. | |
| 7,536,016 B2 * | 5/2009 | Benaloh | 380/277 |
| 7,603,563 B2 * | 10/2009 | Ansell et al. | 713/182 |
| 7,636,691 B2 * | 12/2009 | Maari | 705/51 |

(Continued)

FOREIGN PATENT DOCUMENTS

WO    WO 2010086317    8/2010

OTHER PUBLICATIONS

"Non-Final Office Action", U.S. Appl. No. 13/309,982, (Jan. 17, 2013), 32 pages.

(Continued)

*Primary Examiner* — Dede Zecher
*Assistant Examiner* — Richard McCoy
(74) *Attorney, Agent, or Firm* — Wolfe-SBMC

(57) ABSTRACT

A server receives a video content identifier and a video player identifier from a video player through a network. The video content identifier identifies video content. The video player identifier identifies a video player. Further, the video player identifier is provided to a hash generator to generate a hash of the video player. In addition, the plaintext of the video content is encrypted with the encryption key to generate ciphertext. The encryption key is encrypted with the hash to generate an encrypted encryption key.

20 Claims, 9 Drawing Sheets

(56) References Cited

U.S. PATENT DOCUMENTS

| | | | |
|---|---|---|---|
| 7,680,269 B2 | 3/2010 | Nicolai et al. | |
| 7,693,278 B2 | 4/2010 | Hiramatsu | |
| 7,715,591 B2 | 5/2010 | Owechko et al. | |
| 7,757,299 B2 | 7/2010 | Robert et al. | |
| 7,827,408 B1 | 11/2010 | Gehringer | |
| 7,836,311 B2* | 11/2010 | Kuriya et al. | 713/185 |
| 7,861,312 B2* | 12/2010 | Lee et al. | 726/27 |
| 7,884,854 B2 | 2/2011 | Banner et al. | |
| 8,051,287 B2* | 11/2011 | Shetty et al. | 713/170 |
| 8,082,592 B2* | 12/2011 | Harris | 726/33 |
| 8,095,795 B2* | 1/2012 | Levy | 713/176 |
| 8,099,519 B2 | 1/2012 | Ueda | |
| 8,130,952 B2* | 3/2012 | Shamoon et al. | 380/201 |
| 8,184,182 B2 | 5/2012 | Lee et al. | |
| 8,189,769 B2 | 5/2012 | Ramasamy et al. | |
| 8,199,216 B2 | 6/2012 | Hwang | |
| 8,245,033 B1* | 8/2012 | Shetty et al. | 713/160 |
| 8,291,219 B2* | 10/2012 | Eto | 713/165 |
| 8,300,812 B2 | 10/2012 | Van De Ven | |
| 8,345,976 B2 | 1/2013 | Wang et al. | |
| 8,417,806 B2* | 4/2013 | Chawla et al. | 709/223 |
| 8,428,390 B2 | 4/2013 | Li et al. | |
| 8,520,083 B2 | 8/2013 | Webster et al. | |
| 8,571,308 B2 | 10/2013 | Grafulla-GonzÁLez | |
| 8,619,082 B1 | 12/2013 | Ciurea et al. | |
| 2002/0154779 A1* | 10/2002 | Asano et al. | 380/277 |
| 2004/0030656 A1* | 2/2004 | Kambayashi et al. | 705/59 |
| 2005/0015343 A1* | 1/2005 | Nagai et al. | 705/59 |
| 2005/0201591 A1 | 9/2005 | Kiselewich | |
| 2005/0232463 A1 | 10/2005 | Hirvonen et al. | |
| 2006/0078194 A1 | 4/2006 | Fradkin et al. | |
| 2006/0173846 A1* | 8/2006 | Omae et al. | 707/9 |
| 2007/0070226 A1 | 3/2007 | Matusik et al. | |
| 2008/0120230 A1* | 5/2008 | Lebegue et al. | 705/39 |
| 2009/0125726 A1 | 5/2009 | Iyer et al. | |
| 2009/0259684 A1* | 10/2009 | Knight et al. | 707/104.1 |
| 2009/0276628 A1* | 11/2009 | Cho et al. | 713/168 |
| 2009/0279697 A1 | 11/2009 | Schneider | |
| 2009/0290710 A1* | 11/2009 | Tkachenko et al. | 380/203 |
| 2009/0307489 A1* | 12/2009 | Endoh | 713/168 |
| 2009/0315670 A1* | 12/2009 | Naressi et al. | 340/5.8 |
| 2010/0105454 A1 | 4/2010 | Weber | |
| 2010/0153747 A1 | 6/2010 | Asnaashari et al. | |
| 2010/0172567 A1 | 7/2010 | Prokoski | |
| 2010/0246816 A1 | 9/2010 | Thomas et al. | |
| 2010/0257368 A1 | 10/2010 | Yuen | |
| 2010/0279766 A1 | 11/2010 | Pliska et al. | |
| 2011/0131219 A1* | 6/2011 | Martin-Cocher et al. | 707/754 |
| 2011/0161669 A1* | 6/2011 | Eto | 713/168 |
| 2012/0042167 A1* | 2/2012 | Marking et al. | 713/171 |
| 2012/0173865 A1 | 7/2012 | Swaminathan | |
| 2012/0173880 A1 | 7/2012 | Swaminathan | |
| 2012/0216300 A1* | 8/2012 | Vivolo et al. | 726/30 |
| 2012/0321172 A1 | 12/2012 | Jachalsky et al. | |
| 2013/0132733 A1* | 5/2013 | Agrawal et al. | 713/189 |
| 2013/0142330 A1 | 6/2013 | Schultz | |
| 2013/0191491 A1* | 7/2013 | Kotha et al. | 709/213 |
| 2014/0023291 A1 | 1/2014 | Lin | |
| 2014/0119643 A1 | 5/2014 | Price | |
| 2014/0135962 A1 | 5/2014 | King et al. | |
| 2014/0136976 A1 | 5/2014 | King et al. | |
| 2014/0140626 A1 | 5/2014 | Cho | |
| 2014/0142947 A1 | 5/2014 | King | |
| 2014/0152776 A1 | 6/2014 | Cohen | |
| 2014/0153816 A1 | 6/2014 | Cohen | |
| 2014/0168215 A1 | 6/2014 | Cohen | |
| 2014/0169660 A1 | 6/2014 | Cohen | |
| 2014/0177903 A1 | 6/2014 | Price | |
| 2014/0201630 A1 | 7/2014 | Bryan | |

OTHER PUBLICATIONS

"Time Domain Pitch Scaling using Synchronous Overlap and Add", retrieved from <http://homepages.inspire.net.nz/~jamckinnon/report/sola.htm> on Nov. 12, 2012, 3 pages.

"Waveform Similarity Based Overlap-Add (WSOLA)", retrieved from <http://www.pjsip.org/pjmedia/docs/html/group_PJMED_WSOLA.htm> on Nov. 12, 2012, 4 pages.

De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos325/Bernardini.pdf> on Nov. 12, 2012,(Dec. 7, 2000), 7 pages.

Dolson, Mark "The Phase Vocoder: A Tutorial", retrieved from <http://www.panix.com/~jens/pvoc-dolson.par> on Nov. 12, 2012, 11 pages.

Gutierrez-Osuna, Ricardo "L19: Prosodic Modificatin of Speech", *Lecture based on [Taylor, 2009, ch. 14; Holmes, 2001, ch. 5; Moulines and Charpentier, 1990]*, retrieved from <http://research.cs.tamu.edu/prism/lectures/sp/l19.pdf> on Nov. 12, 2012, 35 pages.

He, et al., "Corner detector based on global and local curvature properties", Retrieved from <http://hub.hku.hk/bitstream/10722/57246/1/142282.pdf> on Dec. 21, 2012, (May 2008), 13 pages.

Hirsch, et al., "Fast Removal of Non-uniform Camera Shake", Retrieved from <http://webdav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.

Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.

Klingbeil, Michael "SPEAR: Sinusoidal Partial Editing Analysis and Resynthesis", retrieved from <http://www.klingbeil.com/spear/> on Nov. 12, 2012, 3 pages.

Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.

McAulay, R. J., et al., "Speech Processing Based on a Sinusoidal Model", *The Lincoln Laboratory Journal*, vol. 1, No. 2, 1998, retrieved from <http://www.II.mit.edu/publications/journal/pdf/vol01_no2/1.2.3.speechprocessing.pdf> on Nov. 12, 2012,(1988), pp. 153-168.

Moinet, Alexis et al., "PVSOLA: A Phase Vocoder with Synchronized Overlap-Add", *Proc. of the 14th Int. Conference on Digital Audio Effects (DAFx-11)*, Paris, France, Sep. 19-23, 2011, retrieved from <http://tcts.fpms.ac.be/publications/papers/2011/dafx2011_pvsola_amtd.pdf> on Nov. 12, 2012,(Sep. 19, 2011), 7 pages.

Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.

Rodet, Xavier "Musical Sound Signal Analysis/Synthesis: Sinusoidal+Residual and Elementary Waveform Models", *TFTS'97 (IEEE Time-Frequency and Time-Scale Workshop 97)*, Coventry, Grande Bretagne, août, 1997, retrieved from <http://articles.ircam.fr/textes/Rodet97e/index.html> on Nov. 12, 2012,(1997),16 pages.

Roelands, Marc et al., "Waveform Similarity Based Overlay-Add (WSOLA) for Time-Scale Modification of Speech: Structures and Evaluation", retrieved from <http://citeseerx.ist.psu.edu/viewdoc/summary?doi=10.1.58.1356> on Nov. 12, 2012, 4 pages.

Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.

Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages.

Serra Xavier "Musical Sound Modeling with Sinusoids Plus Noise", published in C. Roads, S. Pope, A. Picialli, G. De Poli, editors. 1997. *"Musical Signal Processing"*. Swets & Zeitlinger Publishers, retrieved from <http://web.media.mit.edu/~tristan/Classes/MAS.945/Papers/Technical/Serra_SMS_97.pdf> on Nov. 12, 2012,(1997), 25 pages.

(56) References Cited

OTHER PUBLICATIONS

Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012),15 pages.

Upperman, Gina "Changing Pitch with PSOLA for Voice Conversion", retrieved from <http://cnx.org/content/m12474/latest/?collection=col10379/1.1> on Nov. 12, 2012, 1 page.

Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.

Verhelst, Werner et al., "An Overlap-Add Technique Based on Waveform Similarity (WSOLA) for High Quality Time-Scale Modification of Speech", retrieved from <http://citeseerx.ist.psu.edu/viewdoc/download?doi=10.1.1.202.5460&rep=rep1&type=pdf> on Nov. 12, 2012, 4 pages.

Yuan, et al., "Image Deblurring with Blurred/Noisy Image Pairs", *Proceedings of ACM SIGGRAPH*, vol. 26, Issue 3, (Jul. 2007),10 pages.

"Final Office Action", U.S. Appl. No. 13/309,982, Nov. 1, 2013, 34 pages.

Felzenszwalb, et al., "Efficient Belief Propagation for Early Vision", International Journal of Computer Vision, 70(1), 2006, pp. 41-54.

Gastal, et al., "Shared Sampling for Real-Time Alpha Matting", Eurographics 2010, vol. 29, No. 2, 2010, 10 pages.

He, et al., "A Global Sampling Method for Alpha Matting", CVPR 2011, pp. 2049-2056.

Kubo, et al., "Characterization of the Tikhonov Regularization for Numerical Analysis of Inverse Boundary Value Problems by Using the Singular Value Decomposition", Inverse Problems in Engineering Mechanics, 1998, pp. 337-344.

Levin, et al., "A Closed Form Solution to Natural Image Matting", CVPR, 2006, 8 pages.

Park, et al., "Extracting Salient Keywords from Instructional Videos Using Joint Text, Audio and Visual Cues", Proceedings of the Human Language Technology Conference of the North American Chapter of the ACL, Association for Computational Linguistics, Jun. 2006, pp. 109-112.

Radhakrishnan, et al., "A Content-Adaptive Analysis and Representation Framework for Audio Event Discovery from "Unscripted" Multimedia", Hindawi Publishing Corporation, EURASIP Journal on Applied Signal Processing, vol. 2006, Article ID 89013, 2006, 24 pages.

Smaragdis, "A Probabilistic Latent Variable Model for Acoustic Modeling", NIPS, 2006, 6 pages.

Smaragdis, "Supervised and Semi-Supervised Separation of Sounds from Single-Channel Mixtures", ICA'07 Proceedings of the 7th international conference on Independent component analysis and signal separation, 2007, 8 pages.

Smith, et al., "Blue Screen Matting", SIGGRAPH 96 Conference Proceedings, Aug. 1996, 10 pages.

Yang, et al., "A Constant-Space Belief Propagation Algorithm for Stereo Matching", CVPR, 2010, 8 pages.

"Non-Final Office Action", U.S. Appl. No. 13/309,982, Mar. 24, 2014, 35 pages.

"Restriction Requirement", U.S. Appl. No. 13/660,159, Jun. 12, 2014, 6 pages.

"Non-Final Office Action", U.S. Appl. No. 13/690,755, Mar. 28, 2014, 7 pages.

"Final Office Action", U.S. Appl. No. 13/690,755, Sep. 10, 2014, 7 pages.

"Non-Final Office Action", U.S. Appl. No. 13/680,952, Aug. 4, 2014, 8 pages.

"Notice of Allowance", U.S. Appl. No. 13/309,982, Jul. 30, 2014, 6 pages.

Zhu, et al., "Fusion of Time-of-Flight Depth and Stereo for High Accuracy Depth Maps", IEEE Conference on Computer Vision and Pattern Recognition, Jun. 23, 2008, 8 pages.

"Non-Final Office Action", U.S. Appl. No. 13/660,159, Oct. 1, 2014, 7 pages.

"Restriction Requirement", U.S. Appl. No. 13/722,825, Oct. 9, 2014, 7 pages.

* cited by examiner

BINDING OF PROTECTED VIDEO CONTENT TO VIDEO PLAYER WITH ENCRYPTION KEY

TECHNICAL FIELD

This disclosure generally relates to encryption. More particularly, the disclosure relates to encrypted video content.

BACKGROUND

Some current video playback configurations for playback of video content downloaded from the Internet utilize an encryption mechanism to protect the video content. As an example, when a user would like to play video content on a website, the user may be required to have a video player that includes a scripting code, which may be utilized to initiate and load playback of the video content. The scripting code may be included within a file as part of the video player. The video content may be loaded as an asset into the video player at runtime when downloaded.

Further, the video player may be integrated with advertisements, customer graphics, and other content provider specific information that may be utilized to generate revenue from playback of the video content. Accordingly, content providers and advertisers have to ensure that the video player that is provided to a user is the video player that is utilized to play the provided content so that the advertisements and other revenue generating mechanisms are present in the player utilized by the user to play the content. However, current approaches are vulnerable to users retrieving the scripting code from the provided video player and putting the scripting code into their own video players so that they can avoid the advertisements.

A current approach involves the video player performing a hash on the scripting code and sending the hashed scripting code to a server for verification. However, that approach involves the possibility of the hashed scripting code being intercepted en route from the video player to the server. In other words, a security vulnerability may arise if the hashed scripting code is moved from the video player to the server.

SUMMARY

In one aspect of the disclosure, a computer program product is provided. The computer program product includes a computer useable medium having a computer readable program. The computer readable program when executed on a computer causes the computer to receive, at a server, a media content identifier and a media player identifier from a media player through a network. The media content identifier identifies media content. The media player identifier identifies a media player. Further, the computer readable program when executed on the computer causes the computer to provide the media player identifier to a function generator to generate an indicium of the media player identifier. In addition, the computer readable program when executed on the computer causes the computer to perform a first operation on an initialization vector and the indicium to generate a first result. The computer readable program when executed on the computer also causes the computer to perform a second operation on a first subset of plaintext and the first result to generate a second result. The plaintext is the media content. Further, the computer readable program when executed on the computer causes the computer to encrypt the second result with an encryption key to generate a first set of ciphertext.

In another aspect of the disclosure, a process is provided. The process sends, from a video player, a video content identifier and a video player identifier through a network to a server. The video content identifier identifies video content. The video player identifier identifies the video player. Further, the process receives, from the server, a first subset of encrypted video content and an initialization vector. In addition, the process generates a hash of the video player identifier. The process also decrypts the first subset of the encrypted video content with a decryption key to generate a first result. Further, the process performs a first operation on the initialization vector and the hash to generate a second result. In addition, the process performs a second operation on the first result and the second result to generate a first subset of plaintext of video content.

In yet another aspect of the disclosure, system is provided. The system includes a communication module that receives, at a server, a video content identifier and a video player identifier from a video player through a network. The video content identifier identifies video content. The video player identifier identifies a video player. Further, the system includes a hash generator that generates a hash of the video player identifier that is utilized as an initialization vector. In addition, the system includes a processor that (i) performs a first operation on a first subset of plaintext and the initialization vector to generate a first result and (ii) encrypts the first result with an encryption key to generate a first set of ciphertext, the plaintext being the video content.

In another aspect of the disclosure, a computer program product is provided. The computer program product includes a computer useable medium having a computer readable program. The computer readable program when executed on a computer causes the computer to receive, at a server, a video content identifier and a video player identifier from a video player through a network. The video content identifier identifies video content. The video player identifier identifies a video player. Further, the computer readable program when executed on the computer causes the computer to provide the video player identifier to a hash generator to generate a hash of the video player identifier such that the hash is an encryption key. In addition, the computer readable program when executed on the computer causes the computer to encrypt plaintext of the video content with the encryption key to generate ciphertext.

In yet another aspect of the disclosure, a process is provided. The process receives, at a server, a video content identifier and a video player identifier from a video player through a network. The video content identifier identifies video content. The video player identifier identifies a video player. Further, the process provides the video player identifier to a hash generator to generate a hash of the video player. In addition, the process encrypts plaintext of the video content with the encryption key to generate ciphertext. The process also encrypts the encryption key with the hash to generate an encrypted encryption key.

In another aspect of the disclosure, a system is provided. The system includes a communication module that receives, at a server, a video content identifier and a video player identifier from a video player through a network. The video content identifier identifies video content. The video player identifier identifies a video player. Further, the system includes a hash generator that generates a hash of the video player identifier such that the hash is an encryption key. In addition, the system includes a processor that encrypts plaintext of the video content with the encryption key to generate ciphertext.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A configuration is provided that binds encrypted video to a video player. The 'fingerprint', e.g., an identifier, of the video player is integrated into the video itself. As a result, the file including a scripting code that initiates download and playback is prevented from being reused, modified, or hosted in alternate locations. Further, the scripting code that is playing back the video is ensured to be the scripting code that was created by the publisher. In addition, the scripting code is maintained securely as a hash of the scripting code is not sent from the video player to the server. The time of validating the video player is also reduced as a hash of the scripting code is not sent from the video player to the server.

In one embodiment, a cryptographic hash is calculated at the time of asset acquisition, i.e., video download, by both the server of the video content and the consumer of the video content, i.e., the video player. This cryptographic hash is then utilized as an encryption parameter for the encryption of the content.

Figure 1:
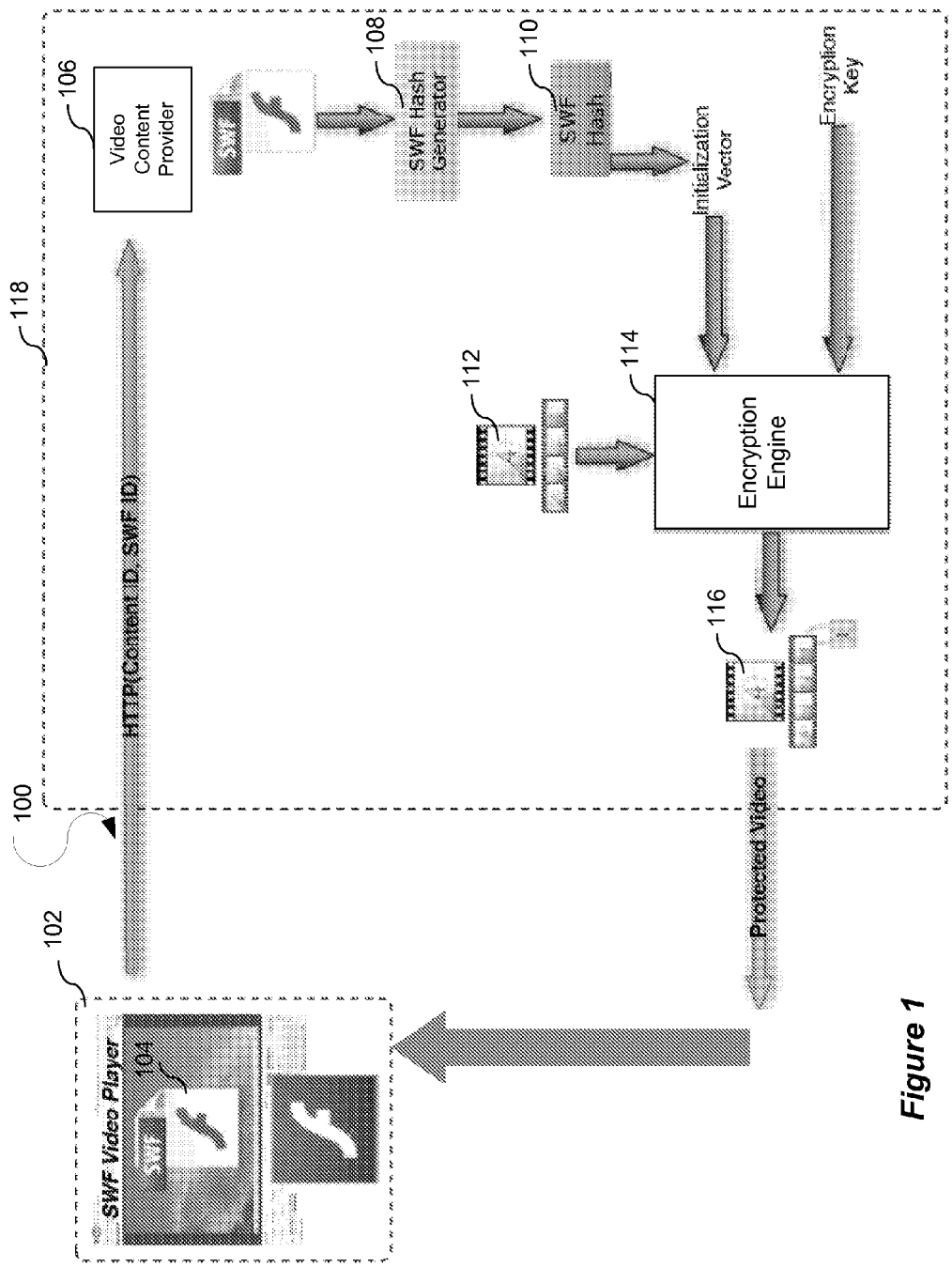
FIG. 1 illustrates an encryption binding configuration 100 that utilizes a block cipher initialization vector.

FIG. 1 illustrates an encryption binding configuration 100 that utilizes a block cipher initialization vector. The encryption binding configuration includes a video player 102. As an example, a user may request that the video player 102 plays a video file 104. For instance, the video player 102 may be a SWF video player and the video file 104 may be a Flash SWF file. When making the request, the user sends a video player ID and a content ID of the video that the user would like to play with the video player 102. For example, the user may send the video player ID and the content ID to a video content provider 106 by utilizing an HTTP command, transmission signal, or the like. In one embodiment, the video content provider 106 is a website that plays video content. For example, a user may be able to search the website for a video of interest and play that video at the website. The video content provider may store the video content in a database. Further, the video content provider may store video player IDs in a database. The video content provider 106 may look up the video player ID and utilize a hash generator 108 to generate a hash 110 of the binary of the video player 102. In one embodiment, the hash 110 is pre-computed prior to the time of the request. In another embodiment, the hash 110 is generated at the time of the request. The video player may be utilized at a client. The client may be any type of computing device or reside on any type of computing device. As yet another example, an HTML5 video tag may be utilized. The content is delivered inside the HTML5 video tag, but the key setup, e.g., hashing of the video player or some other piece of data, occurs in a protected environment. Accordingly, the data traffic, e.g., the video, is delivered via the HTML5 video tag, but a secure configuration is utilized to protect the key derivation.

A cipher is an approach utilized for encryption and/or decryption. Further, a block cipher is a cipher that is utilized to encrypt and/or decrypt data of a fixed length, i.e., blocks. An initialization vector is an input provided to a block cipher that may be utilized for randomization. In one embodiment, the hash 110 is utilized as an initialization vector input into a block cipher. Further, the initialization vector, an encryption key, and video content 112 may then be provided to an encryption engine 114. The encryption engine may utilize the initialization vector and the encryption key as inputs to the block cipher to encrypt the video content 112 to generate an encrypted video 116. The encrypted video 116 may then be sent to the video player 102. In one embodiment, the video player 102 knows in advance the hash configuration that was utilized to generate the hash by the video content provider 106 and the block cipher that was utilized to encrypt the encrypted video 116. The video player 102 then calculates the hash 110 and utilizes the hash 110 to decrypt the encrypted video 116.

In one embodiment, a server 118 may comprise the content provider 106, the hash generator 108, and the encryption engine 114. Accordingly, the video player 102 may communicate with the server 118. In another embodiment, some or all of the content provider 106, the hash generator 108, and the encryption engine 114 may be implemented on different computing devices. The hash generator 108 is provided merely as an example of a function generator. The function generator may generate an indicium for the video player ID such as a hash.

The server 118 may incorporate the hash 110 of the video player ID into the protection of the video asset. The hash 110 of the video player ID is not sent from the client to the server 118. As a result, the hash 110 may be kept or calculated in a secure location on the client and a secure location on the server without being exposed to the outside world. Both the server 118 and the client have the ability to calculate the hash 110 of the video player ID as both the server 118 and the client have access to the video file 104. The server 118 has access to the video file 104 as the server 118 may store copies of all video files and/or corresponding hashes. Further, the client has access to the video file 104 as the client utilizes the video file 104 to play back the video content 112.

By utilizing the hash 110 as a block cipher initialization vector to encrypt the video content 112, a pre-determined key may be utilized for the encryption. As a result, the same encryption key may be utilized any time the video content 112 is encrypted by the encryption engine 114. However, the encryption may be modified on different encryption actions as a result of the hash 110 being inputted into the block cipher.

Figure 2:
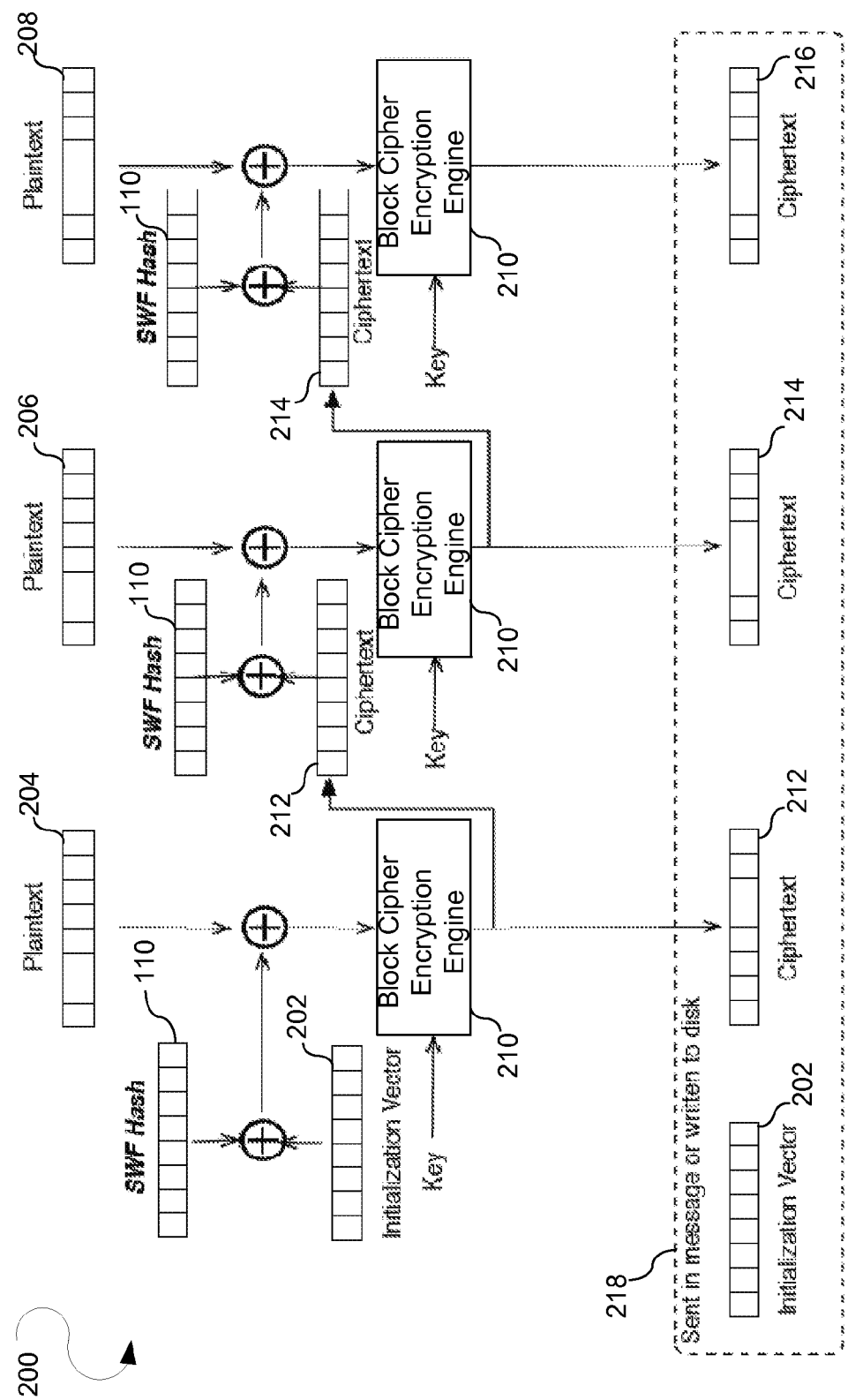
FIG. 2 illustrates a hashed cipher block chaining encryption configuration 200.

FIG. 2 illustrates a hashed cipher block chaining encryption configuration 200. In one embodiment, an operation is performed on the hash 110 and an initialization vector 202. The operation may be an XOR or a variety of other operations. A subsequent operation is then performed on the result and a subset of plaintext 204. The result of the subsequent operation and an encryption key are then provided to a block cipher encryption engine 210 that encrypts the result into ciphertext 212.

An additional subset of plaintext 206 may also be encrypted by utilizing the hash 110. Instead of utilizing the initialization vector 202, an operation is performed on the hash 110 and the ciphertext 212. As an example, the operation may be an XOR. A further operation, e.g., an XOR, may then be performed on the result and the additional subset of plaintext 206. The result and the encryption key may then be provided to the block cipher encryption engine 210 for encryption of the result into additional ciphertext 214.

The hashed cipher block chaining may be utilized for the remaining of the blocks of plaintext. As an example, yet another subset of plaintext 208 may be provided to the block cipher encryption engine 210. Instead of utilizing the initialization vector 202, an operation is performed on the hash 110 and the ciphertext 214. As an example, the operation may be an XOR. A further operation, e.g., an XOR, may then be performed on the result and the other subset of plaintext 208. The result and the encryption key may then be provided to the block cipher encryption engine 210 for encryption of the result into additional ciphertext 216.

The illustrated hashed cipher block chaining encryption may be performed according to the following formula: $C_i=E_k$ ($P_i$ XOR (H XOR ($C_i-1$)), H XOR $C_0$=IV. The variable C is ciphertext, the function E is encryption, the variable P is plaintext, the variable H is hash, and the variable IV is initialization vector. In other words, an XOR is performed on the hash 110 and the initialization vector 202 for the first block of plaintext. An XOR operation is performed on the result and the first block of plaintext. That result is then encrypted. Subsequent blocks of data utilize the ciphertext from the previous block. An XOR operation is performed on the ciphertext from the previous block and the hash 110. Another XOR operation is then performed on that result and the plaintext. Encryption is then performed on that result.

Additional or fewer of blocks of plaintext may be encrypted. The examples provided herein are provided only for illustrative purposes.

A set of data 218 may then be sent to the video player 102. The set of data 218 may include the initialization vector 202 and the various blocks of ciphertext. The video player 202 may then decrypt the blocks of ciphertext by generating the hash 110 and then utilizing the hash, a decryption key, and the initialization vector 202 to decrypt the blocks of ciphertext.

In another embodiment, the hash 110 itself is utilized as the initialization vector 202. Accordingly, an operation would not have to be performed on the hash 110 and the initialization vector 202. Further, the initialization vector 202 would not have to be sent as part of the set of data 118 to the video player 102 as the video player 102 is capable of generating the hash 110.

In one embodiment, the encryption methodology that is utilized is symmetrical encryption. Accordingly, the same key may be utilized both for encryption and decryption. As a result, the client and the server may both store the same key. In another embodiment, the encryption methodology that is utilized is asymmetrical. Accordingly, different keys are utilized for encryption and decryption. Therefore, the server may store an encryption key whereas the client may store a decryption key.

Figure 3:
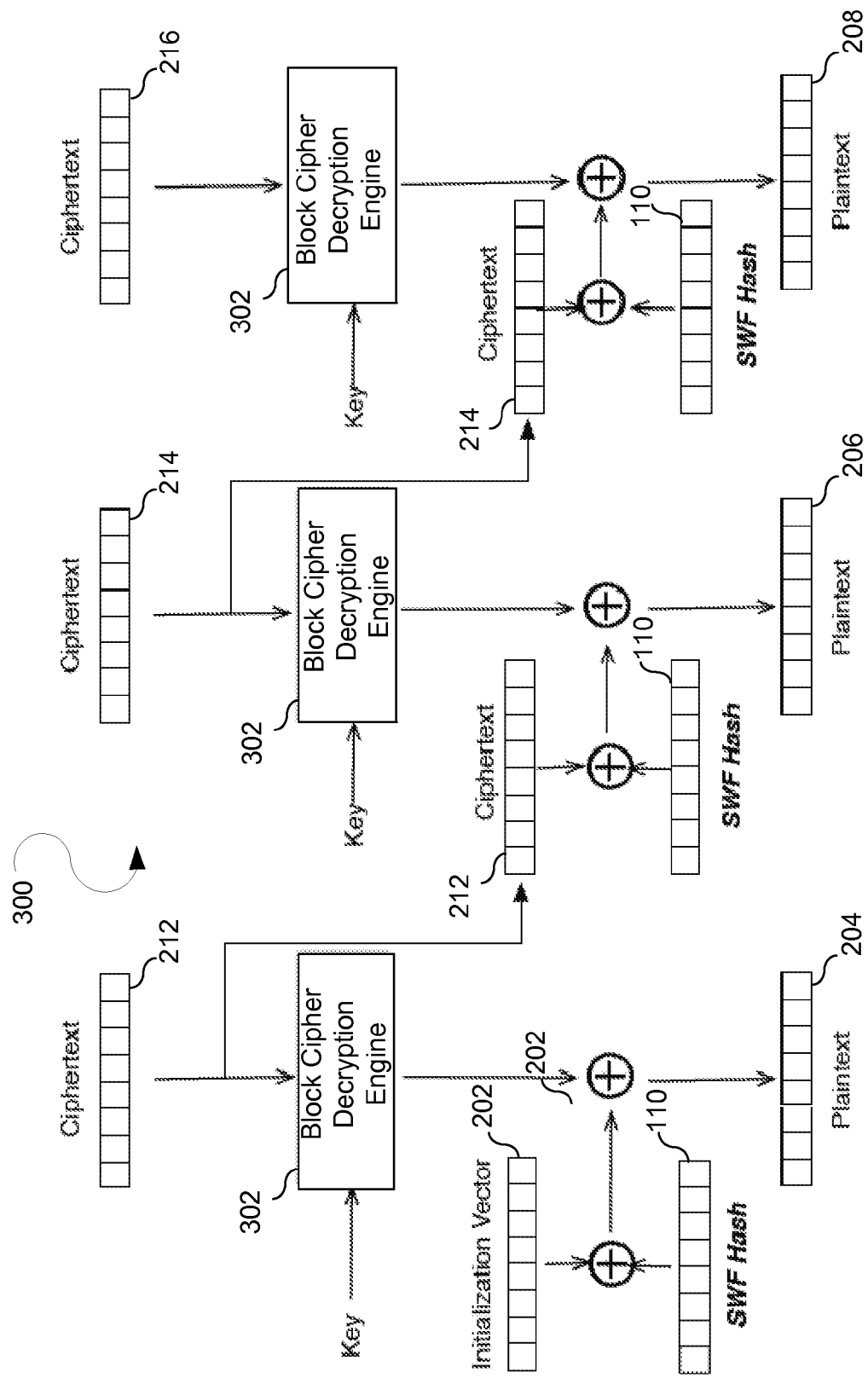
FIG. 3 illustrates a hashed cipher block chaining decryption configuration 300.

FIG. 3 illustrates a hashed cipher block chaining decryption configuration 300. As an example, the video player 102 illustrated in FIG. 1 may utilize the hashed cipher block chaining decryption configuration 300 to decrypt the encrypted video content received from the video content provider 106. A block cipher decryption engine 302 utilizes a key to decrypt the block of ciphertext 212. Further, an operation is performed on the decrypted result. The operation may be an XOR operation or a variety of other operations. In addition, an operation, e.g., an XOR operation, is performed on the initialization vector and the hash 110. An operation, e.g., an XOR operation, is performed on that result and the decrypted result to generate the subset of plaintext 204.

The subsequent blocks utilize the ciphertext of the previous block rather than the initialization vector 202. The block cipher decryption engine 302 utilizes a key to decrypt the block of ciphertext 214. Further, an operation is performed on the decrypted result. The operation may be an XOR operation or a variety of other operations. In addition, an operation, e.g., an XOR operation, is performed on the previous block of ciphertext 212 and the hash 110. An operation, e.g., an XOR operation, is performed on that result and the decrypted result to generate the subset of plaintext 206.

In addition, the block cipher decryption engine 302 utilizes a key to decrypt the block of ciphertext 216. Further, an operation is performed on the decrypted result. The operation may be an XOR operation or a variety of other operations. In addition, an operation, e.g., an XOR operation, is performed on the previous block of ciphertext 214 and the hash 110. An operation, e.g., an XOR operation, is performed on that result and the decrypted result to generate the subset of plaintext 208.

In another embodiment, the hash 110 itself is utilized as the initialization vector 202. Accordingly, an operation would not have to be performed on the hash 110 and the initialization vector 202.

The illustrated hashed cipher block chaining decryption may be performed according to the following formula: $P_i=D_k$ ($C_i$ XOR (H XOR ($C_i-1$)), H XOR $C_0$=IV. The variable C is ciphertext, the function D is encryption, the variable P is plaintext, the variable H is hash, and the variable IV is initialization vector. In other words, a decryption of the first block of ciphertext is performed. An XOR is performed on that result and the result of an XOR performed on the initialization vector 202 and the hash 110 to generate the first set of plaintext. Subsequent blocks of data utilize the ciphertext from the previous block. An XOR operation is performed on the ciphertext from the previous block and the hash 110. Another XOR operation is then performed on that result and the decrypted subsequent block of ciphertext. Encryption is then performed on that result.

Figure 4A:
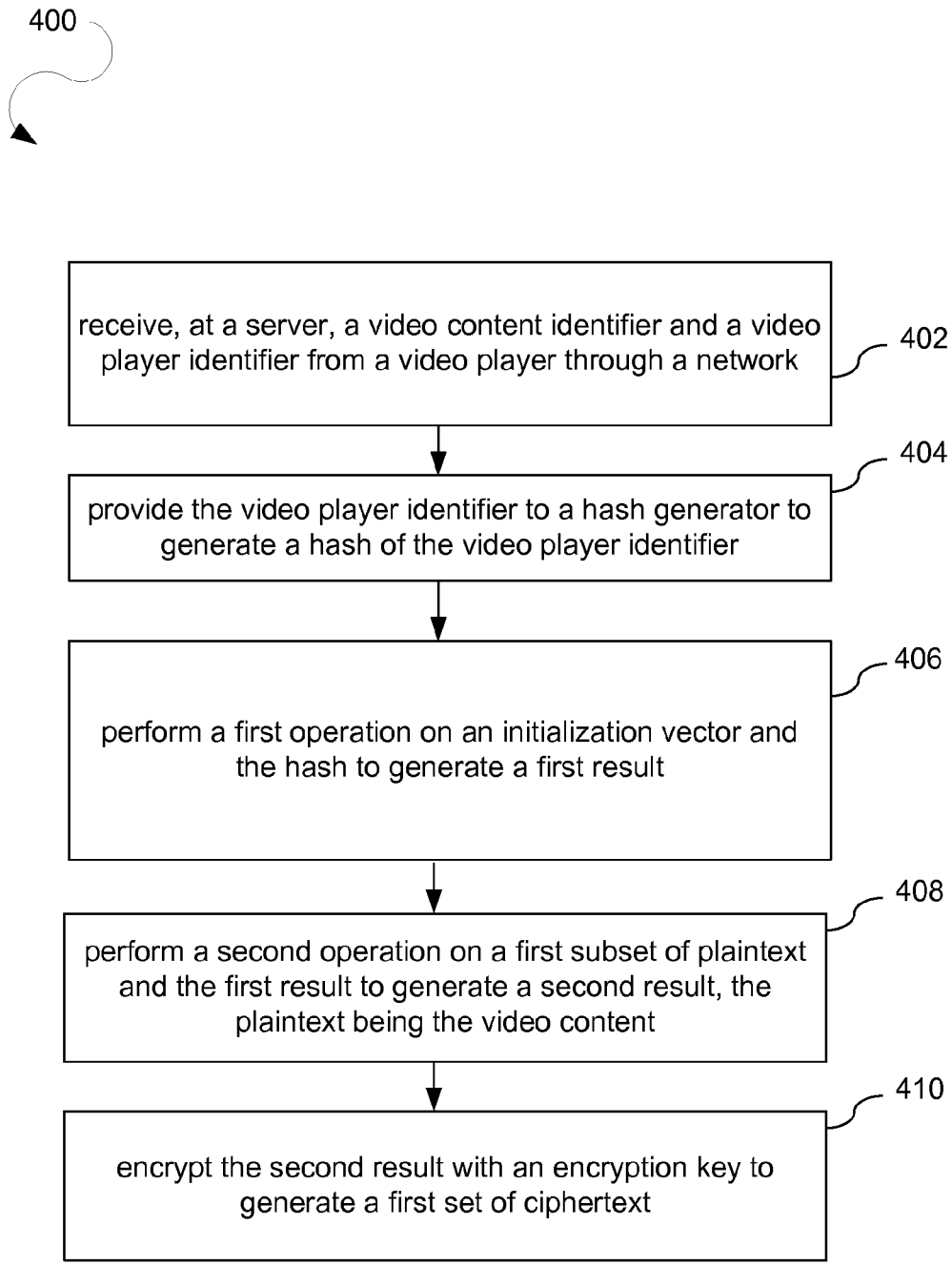
FIG. 4A illustrates a process 400 that may be utilized for encryption.

FIG. 4A illustrates a process 400 that may be utilized for encryption. At a process block 402, the process 400 receives, at a server, a video content identifier and a video player identifier from a video player through a network. The video content identifier identifies video content. The video player identifier identifies a video player. Further, at a process block 404, the process 400 provides the video player identifier to a hash generator to generate a hash of the video player identifier. In addition, at a process block 406, the process 400 performs a first operation on an initialization vector and the hash to generate a first result. At a process block 408, the process 400 also performs a second operation on a first subset of plaintext and the first result to generate a second result. The plaintext is the video content. Further, at a process block 410, the process 400 encrypts the second result with an encryption key to generate a first set of ciphertext.

Figure 4B:
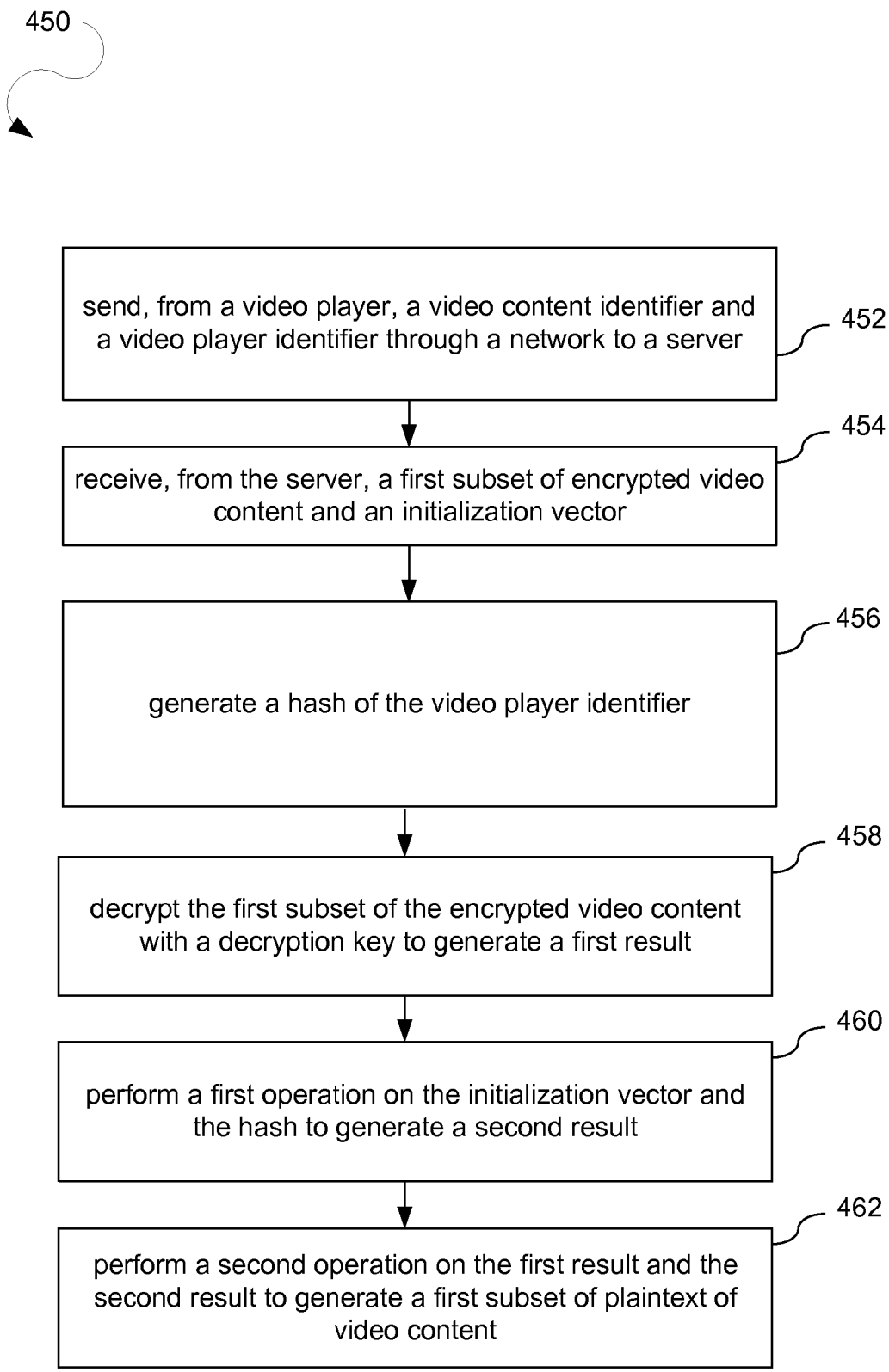
FIG. 4B illustrates a process 450 that may be utilized for decryption.

FIG. 4B illustrates a process 450 that may be utilized for decryption. At a process block 452, the process 450 sends, from a video player, a video content identifier and a video player identifier through a network to a server. The video content identifier identifies video content. The video player identifier identifies the video player. Further, at a process block 454, the process 450 receives, from the server, a first subset of encrypted video content and an initialization vector. In addition, at a process block 456, the process 450 generates a hash of the video player identifier. At a process block 458, the process 450 also decrypts the first subset of the encrypted video content with a decryption key to generate a first result. Further, at a process block 460, the process 450 performs a first operation on the initialization vector and the hash to generate a second result. In addition, at a process block 462, the process 450 performs a second operation on the first result and the second result to generate a first subset of plaintext of video content.

Any of the configurations described herein may be utilized with a variety of computing devices. A computing device may be personal computer ("PC"), laptop, notebook, smartphone, cell phone, tablet device, personal digital assistant ("PDA"), kiosk, or the like.

Figure 5:
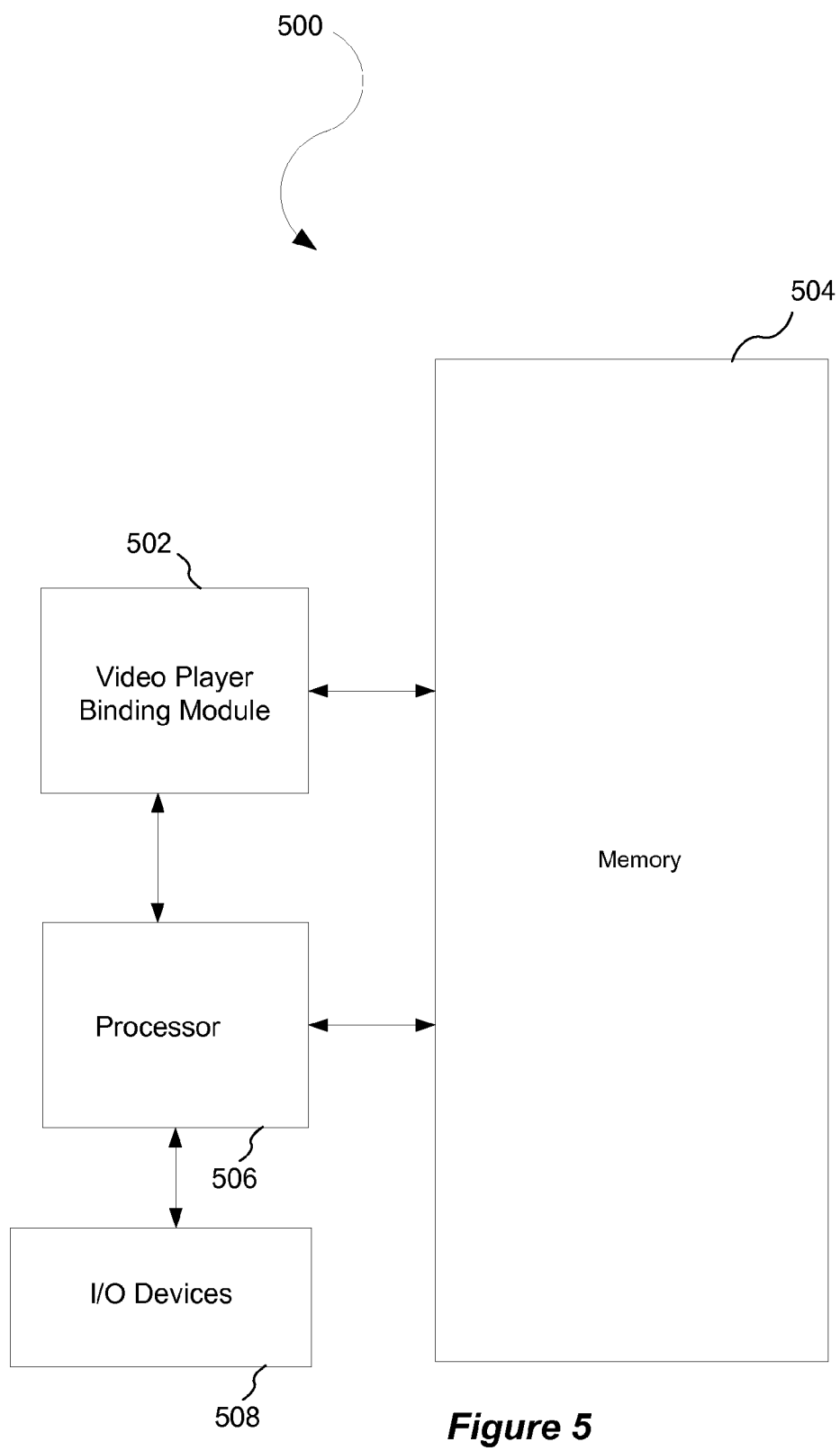
FIG. 5 illustrates a system configuration 500 that may be utilized to bind protected video content to a video player.

FIG. 5 illustrates a system configuration 500 that may be utilized to bind protected video content to a video player. In one embodiment, a video player binding module 502 interacts with a memory 504 and a processor 506. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

In yet another embodiment, the video player 102 may be utilized to protect the video content without a hashed block cipher methodology as described with respect to FIGS. 2 and 3. The hash 110 of the video player identifier may be utilized as the encryption key to encrypt the video content or as an encryption key to encrypt the encryption key that encrypts the video content.

Figure 6:
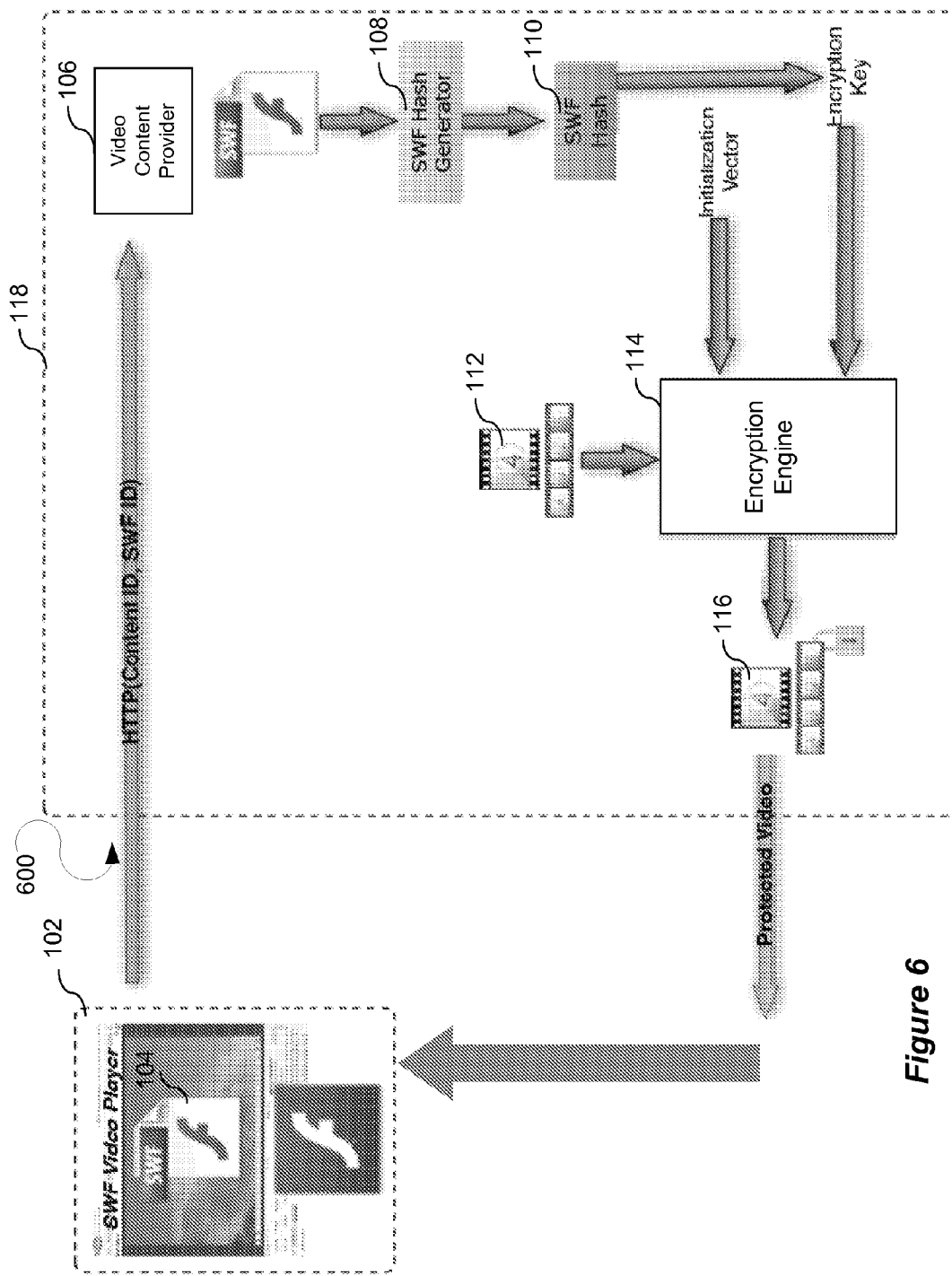
FIG. 6 illustrates an encryption binding configuration that utilizes the hash 110 of the video player identifier as the encryption key to encrypt the video content or as an encryption key to encrypt the encryption key that encrypts the video content.

FIG. 6 illustrates an encryption binding configuration 600 that utilizes the hash 110 of the video player identifier as the encryption key to encrypt the video content or as an encryption key to encrypt the encryption key that encrypts the video content. In particular, the hash 110 is the encryption key itself or is provided with the encryption key to the encryption engine 114. Further, the encryption engine 114 may utilize encryption methodologies other than the hashed block cipher methodology as described with respect to FIGS. 2 and 3. For instance, a stream cipher may be utilized that encrypts the video content with an encryption key without an initialization vector. Further, a block cipher may be utilized with an encryption key and an initialization vector, but with the hash 110 being utilized as the encryption key instead of being utilized as the initialization vector or as an operand to an operand to an operation performed prior to encryption as described with respect to FIGS. 2 and 3. For example, the video content provider 106 may generate the hash 110 from the video player identifier to generate the content encryption key ("CEK"). The video content may then be encrypted by the encryption engine 114 with the CEK.

Figure 7:
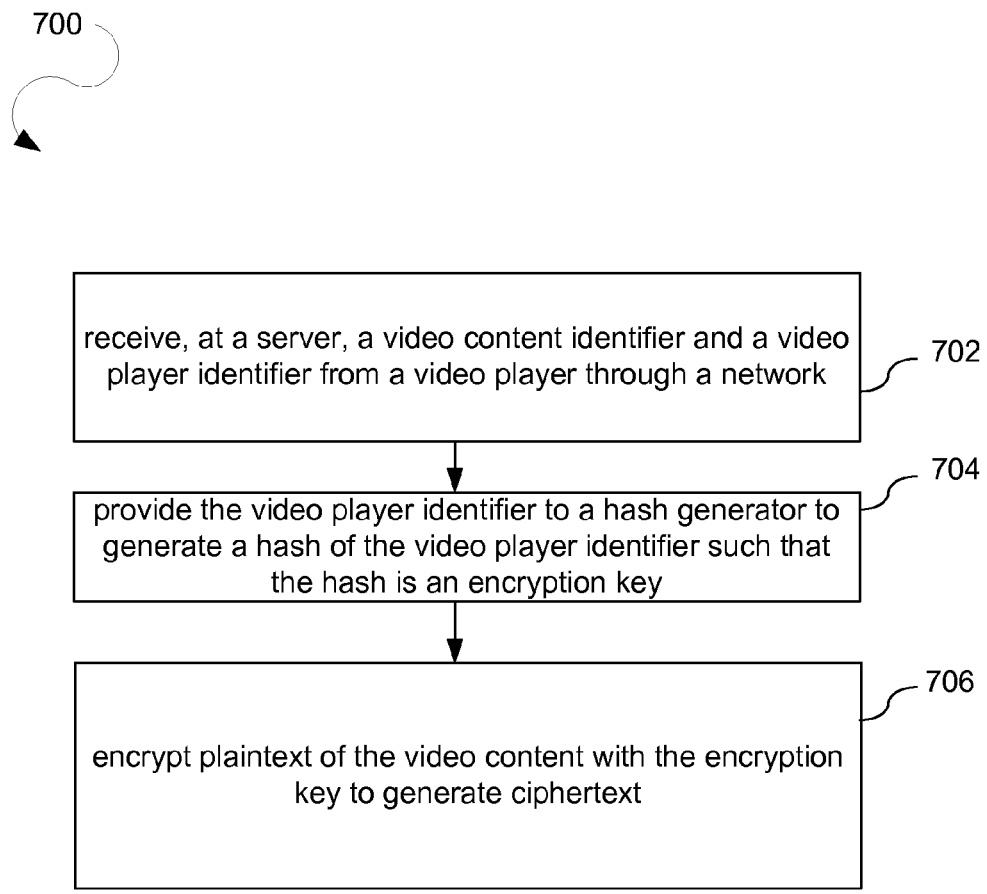
FIG. 7 illustrates a process that utilizes the hash of the video player identifier as the encryption key to encrypt the video content.

FIG. 7 illustrates a process 700 that utilizes the hash 110 of the video player identifier as the encryption key to encrypt the video content. At a process block 702, the process 700 receives, at a server, a video content identifier and a video player identifier from a video player through a network. The video content identifier identifies video content. The video player identifier identifies a video player. Further, at a process block 704, the process provides the video player identifier to a hash generator to generate a hash of the video player identifier such that the hash is an encryption key. In addition, at a process block 706, the process 700 encrypts plaintext of the video content with the encryption key to generate ciphertext. In one embodiment, the process 800 is utilized when each user has a unique video player. Further, various encryption methodologies, e.g., stream cipher, block cipher, or the like, may be utilized.

Figure 8:
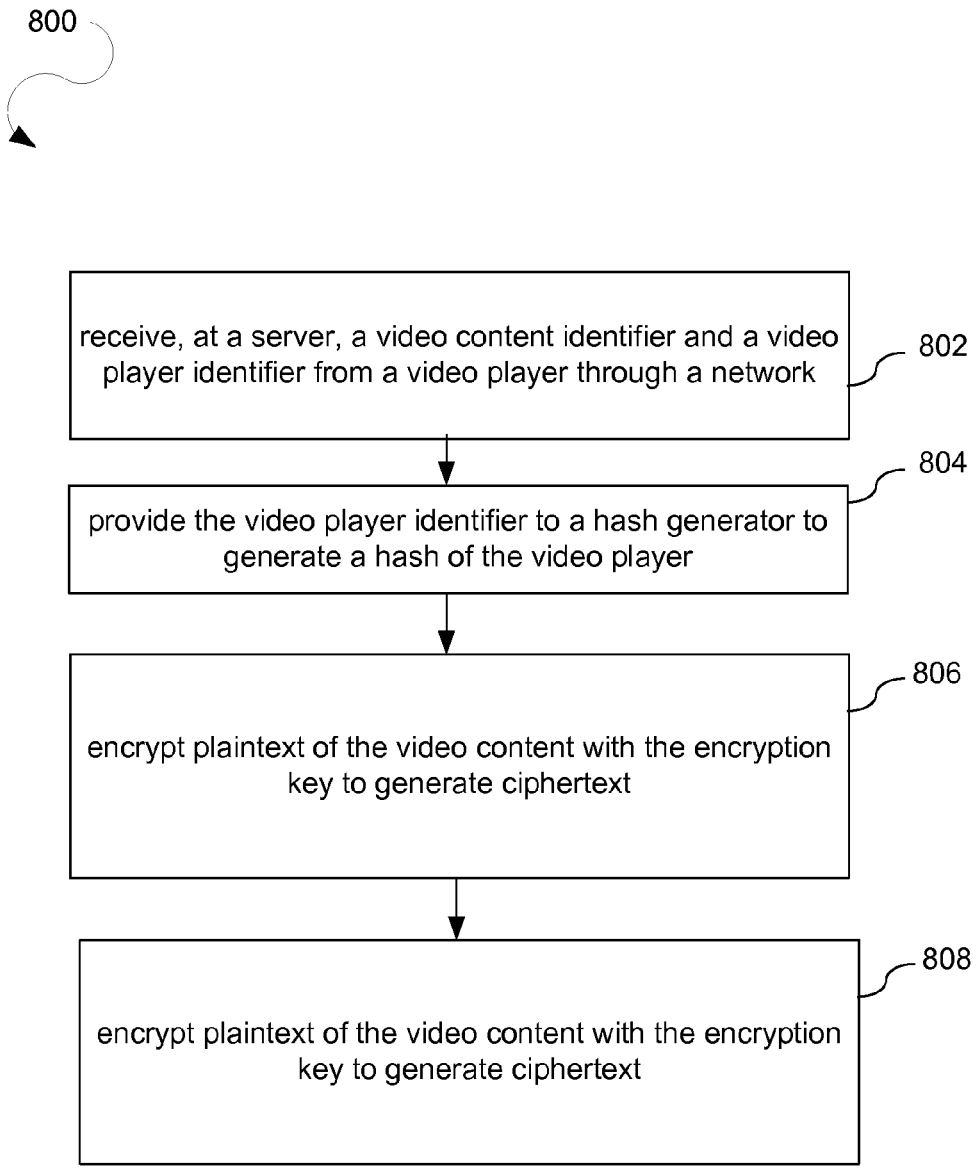
FIG. 8 illustrates a process that that utilizes the hash of the video player identifier as an encryption key to encrypt the encryption key that encrypts the video content.

FIG. 8 illustrates a process 800 that that utilizes the hash 110 of the video player identifier as an encryption key to encrypt the encryption key that encrypts the video content. At a process block 802, the process 800 receives, at a server, a video content identifier and a video player identifier from a video player through a network. The video content identifier identifies video content. The video player identifier identifies a video player. Further, at a process block 804, the process 800 provides the video player identifier to a hash generator to generate a hash of the video player. In addition, at a process block 806, the process 800 encrypts plaintext of the video content with the encryption key to generate ciphertext. At a process block 808, the process 800 also encrypts the encryption key with the hash to generate an encrypted encryption key. In one embodiment, the process 800 provides the ability to pre-encrypt content, i.e., the content is stored encrypted on a server and is not encrypted at streaming time. In such a configuration, an encryption methodology such as a block cipher may be utilized to allow for such pre-encryption. In contrast, a stream cipher would not be compatible with such a configuration as a stream cipher encrypts in real-time.

The processes described herein may be implemented in a general, multi-purpose or single purpose processor. Such a processor will execute instructions, either at the assembly, compiled or machine-level, to perform the processes. Those instructions may be written by one of ordinary skill in the art following the description of the figures corresponding to the processes and stored or transmitted on a computer readable medium. The instructions may also be created utilizing source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. Further, the system configuration 500 may be utilized to implement the process 700 illustrated in FIG. 7 and/or the process 800 illustrated in FIG. 8.

Although an example of a video player has been illustrated, various other types of media players may be utilized. Further, various other types of media identifiers other than video identifiers may be utilized.

It should be understood that the computer program products, processes, apparatuses, and systems described herein can take the form of entirely hardware embodiments, entirely software embodiments, or embodiments containing both hardware and software elements. If software is utilized to implement the method or system, the software may include but is not limited to firmware, resident software, microcode, etc.

It is understood that the computer program products, processes, apparatuses, and systems described herein may also be applied in other types of computer program products, processes, apparatuses, and systems. Those skilled in the art will appreciate that the various adaptations and modifications of the embodiments of the computer program products, processes, apparatuses, and systems described herein may be configured without departing from the scope and spirit of the present computer program products, processes, apparatuses, and systems. Therefore, it is to be understood that, within the scope of the appended claims, the present computer program products, processes, apparatuses, and systems may be practiced other than as specifically described herein.

I claim:

1. One or more computer-readable memory devices comprising stored instructions executable by one or more processors of a server of a video content provider to:
   receive a media content identifier and a media player identifier in a request from a media player residing on a client device, the media content identifier identifying media content, and the media player identifier uniquely identifying the media player;
   provide the media player identifier and a binary of the media player to a function generator to generate an indicium of the media player identifier and the binary of the media player;
   encrypt plaintext of the media content with an encryption key to generate ciphertext, the encryption using the generated indicium of the media player identifier and the binary of the media player as an initialization vector for the encryption; and
   deliver, from the server of the video content provider, encrypted content that includes the ciphertext to the client device, the encrypted content with the ciphertext bound to the unique media player identifier of the media player residing on the client device, the delivery of the encrypted content being effective to enable the media player to generate the indicium of the media player identifier and the binary of the media player to decrypt the ciphertext.

2. The one or more computer-readable memory devices of claim 1, wherein the encryption is performed according to a stream cipher configuration.

3. The one or more computer-readable memory devices of claim 1, wherein the instructions are further executable to cause the server to send the ciphertext, without the indicium, to the media player.

4. The one or more computer-readable memory devices of claim 1, wherein the encryption is performed according to a block cipher configuration.

5. A method comprising:
   receiving, at a server of a video content provider, a video content identifier and a video player identifier in a request from a video player residing on a client device, the video content identifier identifying video content, and the video player identifier uniquely identifying the video player;
   providing the video player identifier and a binary of the video player to a hash generator to generate a hash of the video player identifier and the binary of the video player;
   encrypting plaintext of the video content with an encryption key to generate ciphertext, the encryption using the generated hash of the video player identifier and the binary of the video player as an initialization vector for the encryption; and
   delivering encrypted video content to the client device, the encrypted video content with the ciphertext bound to the unique video player identifier of the video player residing on the client device, the delivery of the encrypted video content being effective to enable the video player to generate the hash of the video player identifier and the binary of the video player to decrypt the encrypted video content.

6. The method of claim 5, wherein the encryption is performed according to a block cipher configuration.

7. A system comprising:
   a server configured as a video content provider;
   a communication module of the server configured to receive a request from a video player residing on a client device, the request comprising a video content identifier and a video player identifier, the video content identifier identifying video content, and the video player identifier uniquely identifying the video player;
   a hash generator configured to generate a hash of the video player identifier and a binary of the video player as an initialization vector; and
   a processor configured to encrypt plaintext of the video content with an encryption key and the generated initialization vector to generate ciphertext, the ciphertext bound to the unique video player identifier of the video player residing on the client device.

8. The system of claim 7, wherein the encryption is performed according to a stream cipher configuration.

9. The system of claim 7, wherein the communication module is configured to communicate encrypted video content including the ciphertext, without the generated hash, to the video player, the encrypted video content being effective to enable the video player to generate the hash of the video player identifier and the binary of the video player to decrypt the encrypted video content.

10. The system of claim 7, wherein the encryption is performed according to a block cipher configuration.

11. The system of claim 7, wherein the generated hash is pre-computed and stored at the server.

12. The system of claim 9, wherein the encrypted video content is communicated by an HTML5 video tag.

13. The system of claim 9, wherein the encrypted video content includes scripting code to initiate playback of the video content.

14. The system of claim 7, wherein the encryption is performed according to a stream cipher configuration.

15. The one or more computer-readable memory devices of claim 1, wherein the generated indicium is pre-computed and stored at the server.

16. The one or more computer-readable memory devices of claim 1, wherein the encrypted content is delivered by an HTML5 video tag.

17. The one or more computer-readable memory devices of claim 1, wherein the encrypted content includes scripting code to initiate playback of the media content.

18. The method of claim 5, wherein the generated hash is pre-computed and stored at the server.

19. The method of claim 5, wherein the encrypted video content is delivered by an HTML5 video tag.

20. The method of claim 5, wherein the encrypted video content includes scripting code to initiate playback of the video content.

* * * * *